(12) United States Patent
Mohamed et al.

(10) Patent No.: US 7,779,045 B2
(45) Date of Patent: Aug. 17, 2010

(54) LAZY UPDATES TO INDEXES IN A DATABASE

(75) Inventors: Ahmed Mohamed, Sammamish, WA (US); Sukhdeep Singh Sodhi, Redmond, WA (US); Matthew Jim Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 11/862,716

(22) Filed: Sep. 27, 2007

(65) Prior Publication Data

US 2009/0089334 A1    Apr. 2, 2009

(51) Int. Cl.
*G06F 17/30* (2006.01)
(52) U.S. Cl. ................................... 707/802
(58) Field of Classification Search ............ None
See application file for complete search history.

(56) References Cited

U.S. PATENT DOCUMENTS

| | | | |
|---|---|---|---|
| 5,842,196 | A | 11/1998 | Agarwal et al. |
| 5,960,194 | A | 9/1999 | Choy et al. |
| 6,055,526 | A | 4/2000 | Ambroziak |
| 7,028,022 | B1 | 4/2006 | Lightstone et al. |
| 2003/0037204 | A1* | 2/2003 | Ash et al. .......... 711/113 |
| 2003/0101183 | A1 | 5/2003 | Kabra et al. |
| 2004/0199530 | A1 | 10/2004 | Avadhanam et al. |
| 2004/0215632 | A1 | 10/2004 | Isip et al. |
| 2006/0106849 | A1 | 5/2006 | Pelletier et al. |
| 2006/0212491 | A1 | 9/2006 | Agrawal et al. |
| 2007/0192535 | A1 | 8/2007 | Winter et al. |
| 2007/0198591 | A1 | 8/2007 | Teng et al. |

OTHER PUBLICATIONS

Jensen et al "Query and Update Efficient B+-Tree Based Indexing of Moving Objects", Proceedings of the 30th VLDB Conference Toronto, Canada 2004, pp. 768-779.*
Raghav Kaushik, et al. "Updates for Structure Indexes". 12 pages, 2002.
Tzi-Cker Chiueh Lan Huang. "Ecient Real-Time Index Updates in Text Retrieval Systems". Computer Science Department, State University of New York at Stony Brook. 15 pages, 1999.
Dongseop Kwon, et al. "Indexing the Current Positions of Moving Objects Using the Lazy Update R-tree". School of Electrical Engineering and Computer Science, Seoul National University, Seoul, Korea. 8 pages.
"SQL Object 0.9". www.sqlobject.org/SQLObect.html. 11 pages, printed Oct. 8, 2007.
International Search Report dated Mar. 31, 2009, for PCT Application Serial No. PCT/US2008/077951, 13 pages.

* cited by examiner

*Primary Examiner*—Uyen T. Le
(74) *Attorney, Agent, or Firm*—Turocy & Watson, LLP

(57) ABSTRACT

System(s) and method(s) facilitate improved performance for insert/update query requests in a database. A lazy updating based on delaying updates of newly inserted records combined with a master-staging partitioning scheme avoid deterioration of performance arising from updating indexes related to new records inserted in a database. Table partitioning as well as partitioning of indexes associated with the table allow new records to reside in manageable sections of memory for pre-configured periods of times prior to being updated. To avoid deterioration of performance associated with increasing size of table/index partitions, the size is maintained below specific thresholds that can be determined based on query workload and other historical data. Deployment of partitions among file systems and design of update delay times can further increase performance of lazy updating.

20 Claims, 11 Drawing Sheets

LAZY UPDATES TO INDEXES IN A DATABASE

TECHNICAL FIELD

The claimed subject matter relates to data processing, with emphasis on updating indexes of a database through dynamic partitioning.

BACKGROUND

Numerous applications ranging from e-commerce, government records, on-line education and libraries, as well as web-based services in general, rely on databases. Databases are a class of applications that manipulate large amounts of stored data. Such massive compilation of data is typically stored as tables. Conceptually, tables are a collection of rows and columns with each row containing a record and the columns determining what types of values populate a record. As the number of records proliferates, the size of such tables quickly grows larger and manipulation steps such as searches or queries that scan the whole table to retrieve a subset of the data matching a certain criteria or pattern become inefficient to the point of impracticality. The source of the inefficiency is the exhaustive inspection of each record in the table that is conducted in a search of query in order to determine whether a record matches desired criteria.

To mitigate the effects of exhaustive inspection, most database designs build and exploit indexes. Such indexes are typically sorted and contain a subset of the original record with a pointer to the corresponding record in the table. In this manner, queries that inspect an index are efficient, and practical, since they deal with a smaller set of data. Yet, the tradeoff of employing indexes for improved query performance is the degradation of the performance of inserts/updates to a table. The degradation arises from the fact that whenever a table is updated, the related indexes associated with the table required to be updated as well in order to present a consistent view to any queries that the database might handle. Such degradation remains a challenge to database designers and an obstacle to exploiting light-weight indexation for efficiently resolving insert/update requests.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

System(s) and method(s) facilitate improved performance for insert/update query requests in a database. A lazy updating based on delaying updates of newly inserted records combined with a master-staging partitioning scheme avoid deterioration of performance arising from updating indexes related to new records inserted in a database. Table partitioning as well as partitioning of indexes associated with the table allow new records to reside in small sectors of memory for a pre-configured periods of times prior to being updated. The periods of time can be scheduled or non-programmed. In the latter, new records arising from resolving an insert/update request can reside in a temporary or ephemeral partition during periods of high activity of a system that hosts the database and/or a client application. At times when the system is idle, new records are updated to the table that they were intended for.

To avoid the typical deterioration of performance associated with increasing size of table/index partitions within lazy updating, the size of the partitions is maintained below specific thresholds that can be determined based on system/application requirements, query workload, and/or other historical database intelligence (e.g., data) in connection with the database. Partitions containing new records are deployed in response to an insert/update request rather than on the record content or format. In addition, deployment of partitions is independent of physical deployment of the table being manipulated. In particular, partitions can be deployed among file systems, and distributed databases and servers. Deployment customization of partitions based on database intelligence, and customization of delay times can further increase performance of lazy updating.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DETAILED DESCRIPTION

Figure 1:
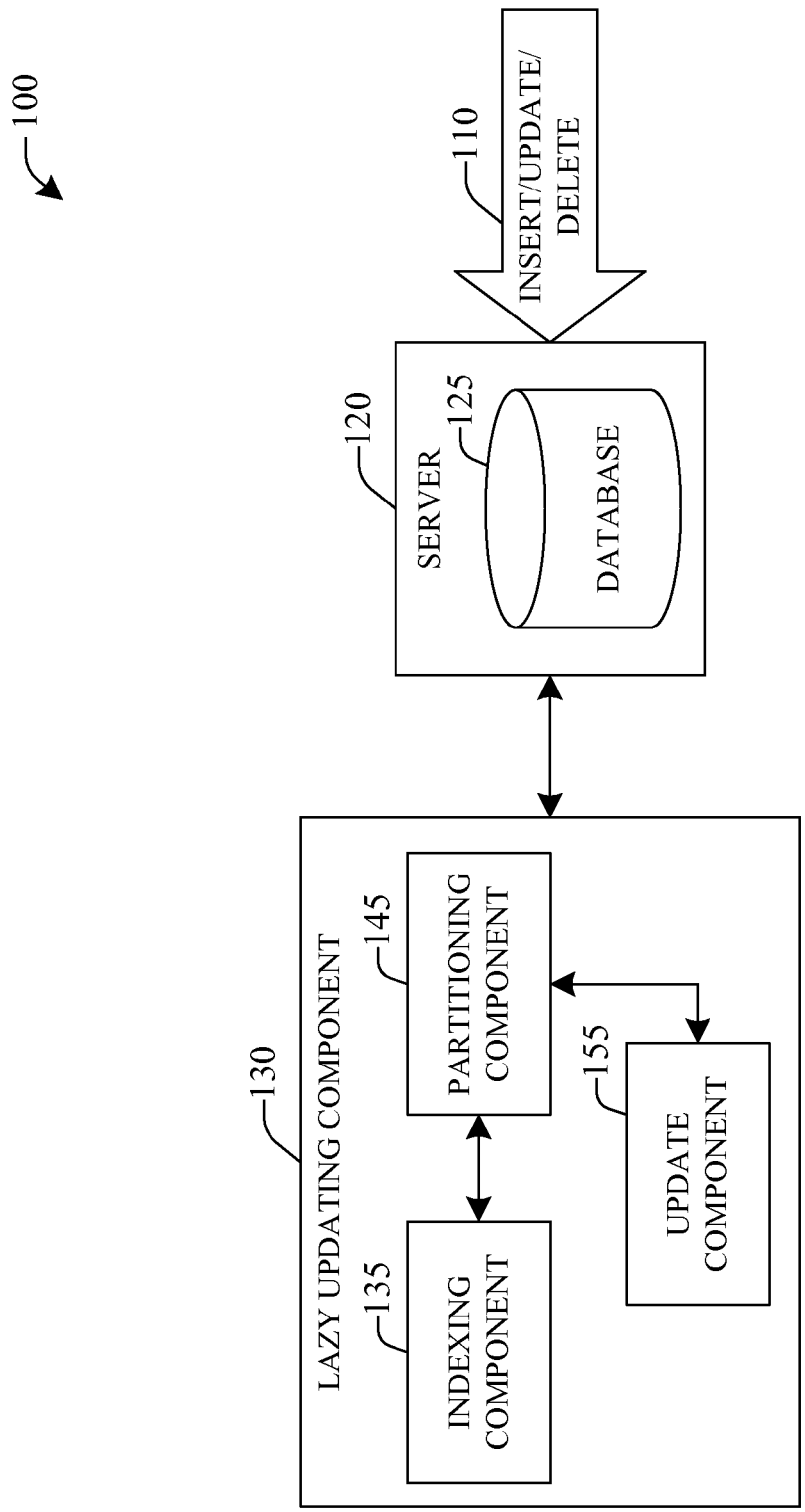
FIG. 1 illustrates an example system that facilitates lazy updating of a database indexes.

The present innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present innovation.

As used in the subject specification, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

System(s) and method(s) facilitate improved performance for insert/update query requests in a database. A lazy updating based on delaying updates of newly inserted records combined with a master-staging partitioning scheme avoid deterioration of performance arising from updating indexes related to new records inserted in a database. Customization of partition sizes and delay times can be employed to further improve performance. Such systems and methods are described next.

FIG. 1 illustrates an example system 100 that facilitates lazy updating of database indexes. Generally, updating indexes in a database is a response to manipulating, e.g. inserting, updating, or deleting, records in a table present in the database. In system 100, an insert/update/delete (IUD) request 110 of a record in a table is received by a server 120 that hosts a database 125 where the table being manipulated resides. It should be appreciated that the data server 120 can be based on various platforms and query programming models, such as MySQL, PosgreSQL, Microsoft® SQL Server™ 2005, IBM DB2®, etc. IUD request 110 thus conforms to the query programming model (e.g. SQL, LINQ, XQuery, and so forth) of the data server 120 where the queried database (e.g., database 125) resides. IUD request 110 is processed (e.g., resolved) in a lazy updating component 130 which inserts, deletes, or updates the record in the table, and lazily updates indexes associated with the table in the database in order to preserve a consistent view for queries on the database. Lazy updating consists of delaying updates of partitions and indexes associated with newly inserted records.

In system 100, three sub-components provide the lazy updating of indexes capability to component 130. (i) Indexing component 135 which generates indexes for tables in a database (e.g., database 125). Indexes contain a subset of an original record, and a pointer to a corresponding record in a table. Indexes can be stored in a file system that is determined by indexing component 135. Typically, index storage can be accomplished using B-trees.

(ii) Partitioning component 145 can create partitions of such tables and their associated indexes. In an aspect, a table is partitioned into two classes of partitions: master partition, and staging partition(s). A single master partition contains all the records of a table, and a single master partition can be assigned to such a table. In turn, a staging partition contains new records (e.g., arising from an IUD request to insert, generated by a database management system application or a client application (not shown)). Multiple staging partitions are possible for a specific table. A most recently created staging partition is identified as the active partition and all new inserts are redirected to it. A query (for example a SELECT in SQL) generally goes over both a master partition and a staging partition(s). Typically, when a table or index is partitioned, partitioning component 141 can be responsible for directing an inserted record to the correct partition in the table. Such determination can be based on the values contained in the record. Additionally, partitioning component 141 can ensure that when a query takes place over a partitioned table, or index, results from all the partitions for that table or index are returned. It should be appreciated that such table and index partitions are manageable sections of memory that can reside in disparate file systems, particularly in distributed databases and multiple server architectures.

Partitioning component 145 determines the size of a generated partition. Typically, to avoid large partitions, a threshold size for a partition determines the largest partition that can be generated. It is noted that as index partitions are logically related to table partitions, via the portion of a record that is contained in an index, limiting the size of a table partition is typically sufficient to limit the size of the index partitions. In addition, table partitions can be created in disparate file systems or file groups, such file groups can be deployed in physically different storage units (e.g., hard drives). In an aspect, depending on query workload directed to specific records in specific partitions, partitioning component can determine the file systems where table partitions are created.

(iii) Update component 145 maintains updated indexes to present a consistent view to any queries that might be received by server 120 after an IUD 110 request has been resolved, e.g. a new record is created. However, to mitigate performance degradation originated from such an update as the number of indexes increase, update component 145 delays updates to indexes that are not required immediately after an IUD request (e.g. request 110) is resolved. An applied update delay can be (a) scheduled—e.g., carried out at pre-configured times after insertion of a new record, or pre-configured time intervals regardless of an actual insertion; or (b) non-programmed, occurring when system 100 is idle. In view of the delay, and the limit size for a table partition, update component 145 can updated record at instances other than stipulated by timing: Once a number of partitions carrying new records reaches a predetermined level, which can be determined on database architecture, database usage, type of records, and so on, update component can update outstanding table partitions; where outstanding partitions are those partitions that have reached the threshold size but remain to be updated into the master partition of a corresponding table. In an aspect, the update consists of appending an outstanding partition to a base partition (see below).

It is noted that lazy updating, such as implemented by lazy updating component 130, can be employed with substantially any database model that supports indexing, e.g. relational model, hierarchical model, fuzzy model, object model, and so on. Additionally, lazy updating can be employed in conjunction with any application that relies on indexes to manipulate records in a database.

Figure 2:
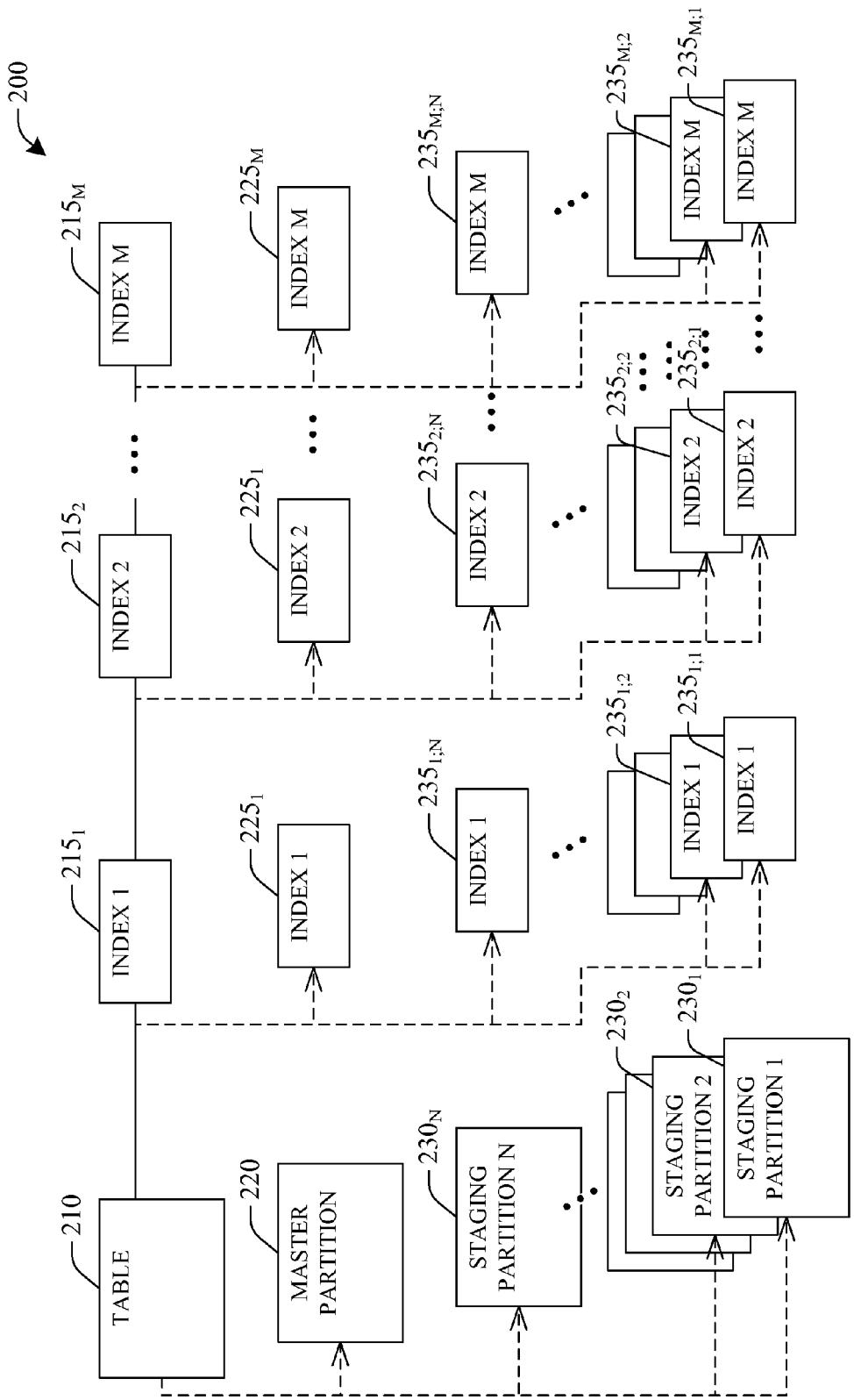
FIG. 2 is a diagram of a logic representation of a table with a lazy updating scheme.

FIG. 2 is a diagram 200 of a logic representation of a table with a lazy partitioning scheme. As discussed above, table 210 is partitioned according to a master partition 220 and one or more staging partitions $230_1$-$230_N$, with N a natural number greater or equal than 1. In diagram 200, indexes $215_1$-$215_M$ associated with table 210 are also partitioned. Indexes partitions $225_1$-$225_M$ are in correspondence with the master partition 220, and indexes $235_{1,J}$-$235_{M,J}$ (J=1, . . . , N) are in correspondence with staging partitions $230_1$-$230_N$. Partitions associated with table 210 and index partitions can be created in disparate file systems. In diagram 200, staging partition $230_N$ is the active staging partition wherein new records are stored. In turn, partitions $230_1$-$230_{N-1}$ have each reached a threshold size, predetermined in as aspect by partitioning component 145, and are in condition to be merged with (or appended to) master partition 220 in an update event, as discussed above. It should be appreciated that disparate staging partitions can be created, or deployed, in disparate file systems (e.g., file groups). In another aspect, a staging partition that has reached the predetermined threshold size can be re-deployed (through partitioning component 145) to a disparate file system from the one in which the partition was originally created, thus opening storage space for active stage partitions (e.g., $230_N$). Such redeployment can be suited for data servers with intense traffic of IUD requests, such as databases employed during televised fund raising events or publicly rated televised contests where a massive number of records are inserted (e.g., through phone calls) in a short period of time. Likewise, database employed in stock trading can exploit such re-deployment of passive staging partition. Still other systems that can benefit from re-deployment of staging partitions are wireless computing devices, in which available memory is limited. It should further be appreciated that staging partitions associated with indexes that are accessed rarely can be created in a different file system from those in which staging partitions associated with frequently accessed indexes are deployed.

Figure 3:
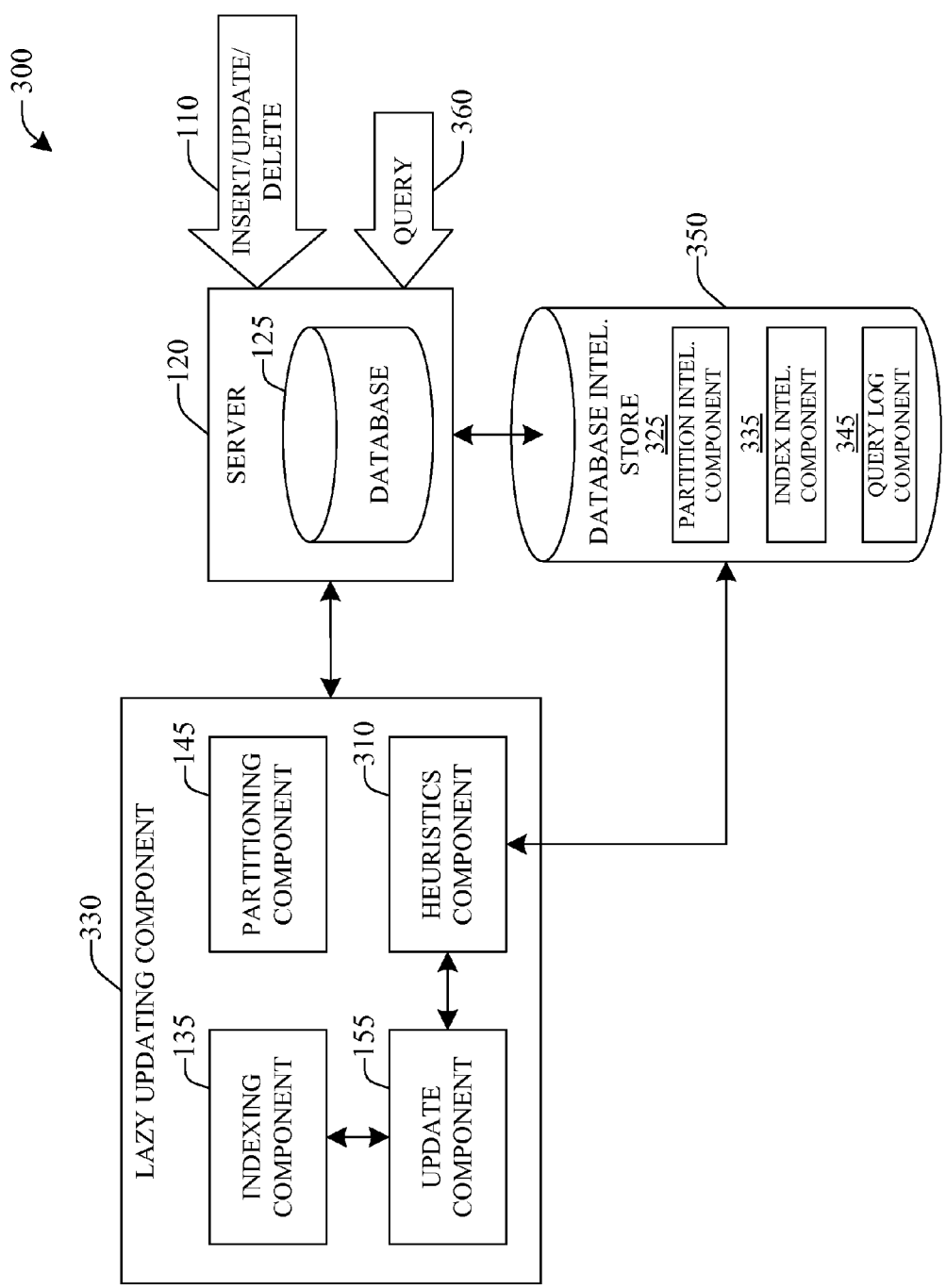
FIG. 3 illustrates an example system that exploits heuristics to facilitate lazy update of indexes in a database.

As discussed above, deployment of a partition can be based on the partition's size or state, either active or passive (in condition to merge/update). Additionally, rate access of a set of indexes (e.g., high (frequently accessed) or low (rarely accessed)) associated with a table or index partition can determine the location in a file system of said partition. As an example, a database (e.g., database 125) can get queries that consistently target a few columns from a table, thus indexes containing such columns would be frequently accessed. Generally, a state/condition of one or more partitions and heuristics related to a database can be exploited to determine where in a computer system associated with the database to create one or more partitions for improved performance. FIG. 3 illustrates an example system 300 that exploits heuristics to facilitate lazy update of indexes in a database (e.g. database 125).

In system 300, lazy updating component 330 is augmented with a heuristics component 310 with respect to component 130. Such heuristics component 310 retrieves intelligence from a database intelligence store that contains partition intelligence component 325, index intelligence component 335, and query (or transaction) log component 345. The various intelligence contents can be gathered by database intelligence store 320 from lazy updating component 330 and from analysis of query and IUD workload. Partitioning component 145 and indexing component 135 convey information to partition intelligence component 325 and index intelligence component 335 once a partition is created and/or an index is updated. In addition, indexing intelligence component 335 is also collected from query (or transaction) workload. It is noted that the term "intelligence" as used herein in connection with storage 320, and components 325 and 335 refers to information that characterizes history data/records and/or behavior of a database (e.g., database 125) as well as indexing component 135 and partitioning component 145. For example, a partition size employed as a threshold for creation of new staging partitions constitutes partitioning intelligence, the file group in a file system wherein a partition is created is also partition intelligence. The type of records in indexes associated with a database is indexing intelligence. Additionally, the volume of IUD requests and queries received by server 120 corresponds to as aspect of database intelligence (in particular such intelligence overlaps with intelligence in query log component 345.)

Heuristics component 310 can employ artificial intelligence to analyze information retrieved from the sources described above. In this instance, the term "intelligence" refers to the ability to reason or draw conclusions about, e.g. infer, the current or future state of a system (e.g., partitioning configuration of a database) based on existing information (e.g., database intelligence 320) about the system (e.g. database 125). Artificial intelligence (AI) can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system. In particular, heuristics component 310 can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Heuristics component 300 can infer which indexes should be updated lazily, as described above, and which indexes should be updated eagerly (e.g. with a substantially or negligible delay time). Additionally, based on analysis of records and query workload, heuristics component can determine a group of threshold sizes for staging as well as master partitions. Such threshold sizes can be employed by partitioning component 145 at different periods of times of data server 120 operation. In one aspect, depending on query and IUD load, larger partitions can be considered in periods of intense traffic, to avoid latencies introduced by creating new staging partition at a high rate. It should be appreciated that a trade off exists between latency mitigation and performance detriment due to employing large size partitions. Based on AI techniques, heuristics component 310 can determine an optimal partition size that reflects such trade off.

In another aspect, alternatively or additionally, smaller staging partitions can be determined to use by heuristics component 310 in periods of lighter query load, where latency is not critical to performance. In such a case, improved performance on query response can occur as a consequence of manipulation of a small number of records.

In yet another aspect, analysis of gathered intelligence can indicate periods of high query workload, such as the beginning of a stock trade session, or closing, in connection with a database that processes trade transactions, as well as at the beginning of office work, in relation to access to an email server running on top of a data server. During such periods of intense activity, heuristics component 310 can implement lazy updates at specific times, and time intervals, rather than probing for instants in which a server is idle to perform an update (e.g., merge a staging partition 230 with a master partition 220). In such a case, updating component 155 receives nearly-optimal timing information (e.g., $\Delta \tau_U$ or a set of times $\{\tau_1, \tau_2, \ldots, \tau_K\}$ that repeat periodically, such as every minute, hour or day) that can optimize query performance.

In still another aspect, heuristics component 310 can determine based on database intelligence 320 and AI techniques a maximum allowable size for an active staging partition (e.g., partition $230_N$) before it is placed in passive state, and a new staging partition is created. Such partition size can be correlated with the type and content of new indexes associated with records to be inserted. It should be appreciated that having a maximum allowable partition size can ensure that the partitions can be manageable sections of memory with respect to resolving IUD requests.

In a further aspect, heuristics component 310 can employ the intelligence collected by query log component 345 on database usage, and identify past usage patterns. Such patterns can provide heuristic component 310, and lazy updating component 130, with a fingerprint of database usage that can facilitate determination as to whether employ lazy updates, or avoid delays when updating records.

Figure 4:
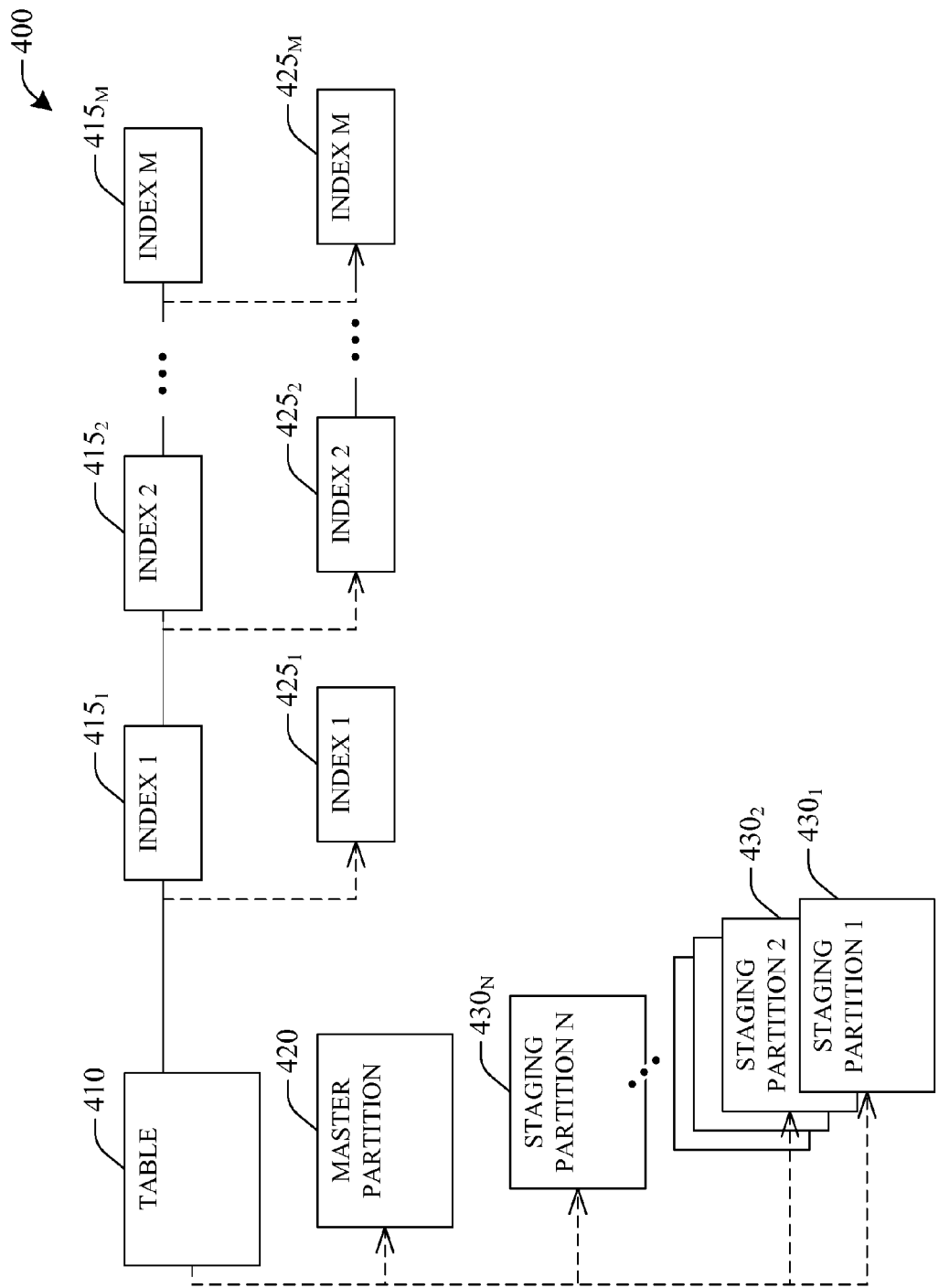
FIG. 4 illustrates a diagram of a logic representation of a table with a lazy partitioning scheme that does not utilize indexes in staging partitions.

FIG. 4 illustrates a diagram 400 of a logic representation of a table with a lazy partitioning scheme that does not utilize indexes in staging partitions. According to diagram 400, partitioning of table 410 (with indexes $415_1$-$415_M$) is substantially the same as partitioning of table 210. A single master partition 420 contains all records and is updated at predetermined times, or when a data server that hosts a database is idle (inactive period). Master partition 420 is indexed and the indexes ($425_1$-$425_M$) contain all records that have been persisted to table 420. New records also reside in indexes $425_1$-$425_M$ of master partition 420. Staging partitions $430_1$-$430_N$ can be created according to lazy partitioning discussed hereinbefore in connection with FIG. 1. It should be appreciated that management of staging partitions $430_1$-$430_N$ can also benefit from heuristics based on database intelligence (see FIG. 3 and corresponding discussion).

As illustrated in diagram 400, staging partitions $430_1$-$430_N$ lack indexes. Such an operational design of lazy partitioning can optimize performance in scenarios that are insertion intensive and thus demand resolving an IUD requests (e.g., IUD 110). Such an scenario can correspond to one in which there is (i) a fast succession of IUD requests that insert new records followed immediately by (ii) a query (e.g. SELECT in SQL) and (iii) long intervals of inactivity (idle state). The likely outcome of such scenario can be that substantially few new records exists, as a result of the extended periods of inactivity in which a last set of inserted records can be merged with, or updated into, the master partition. The behavior for queries (e.g., a SELECT query in SQL) can require a modification to support generation of different query execution plans for the master partition, which does possess indexes, and staging partitions which do not.

Figure 5A:
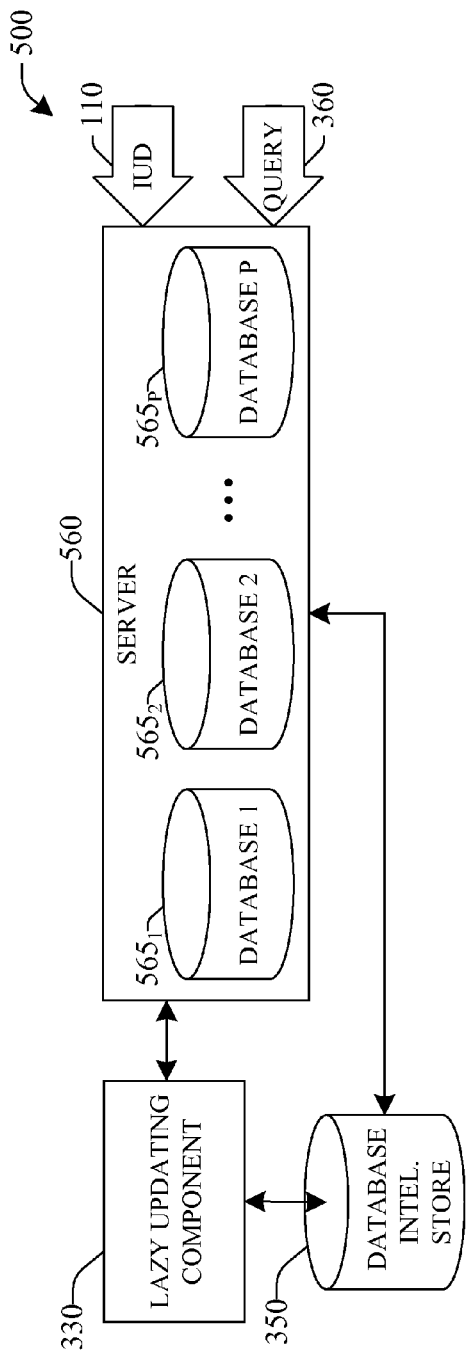
FIGS. 5A and 5B illustrate example systems that facilitate, respectively, lazy updating of indexes in distributed databases and data servers according to aspects of the subject innovation.

FIG. 5A illustrates an example system 500 that facilitates lazy updating of indexes in distributed databases. Lazy updating component 330 is coupled to server 560, which hosts databases $565_1$-$565_P$. It should be appreciated that component 330 need not be distributed, and a centralized architecture for lazy updating, complemented with heuristics and database intelligence can improve performance of distributed databases. A IUD request 110 is received by server 560. Given the distributed nature of databases $565_1$-$565_P$, lazy updating component 330 determines in which database the new record has to be inserted, as partitioning component 145 can generate multiple partitions across databases $565_1$-$565_P$. Such determination is based on the characteristics of the parallelization of data into databases $565_1$-$565_P$, it should be appreciated that staging partitions $230_1$-$230_N$ can be deployed on disparate physical file systems. Due to the parallel nature, partitions of a table can be deployed according to usage, which can be determined by database intelligence store 350.

Figure 5B:
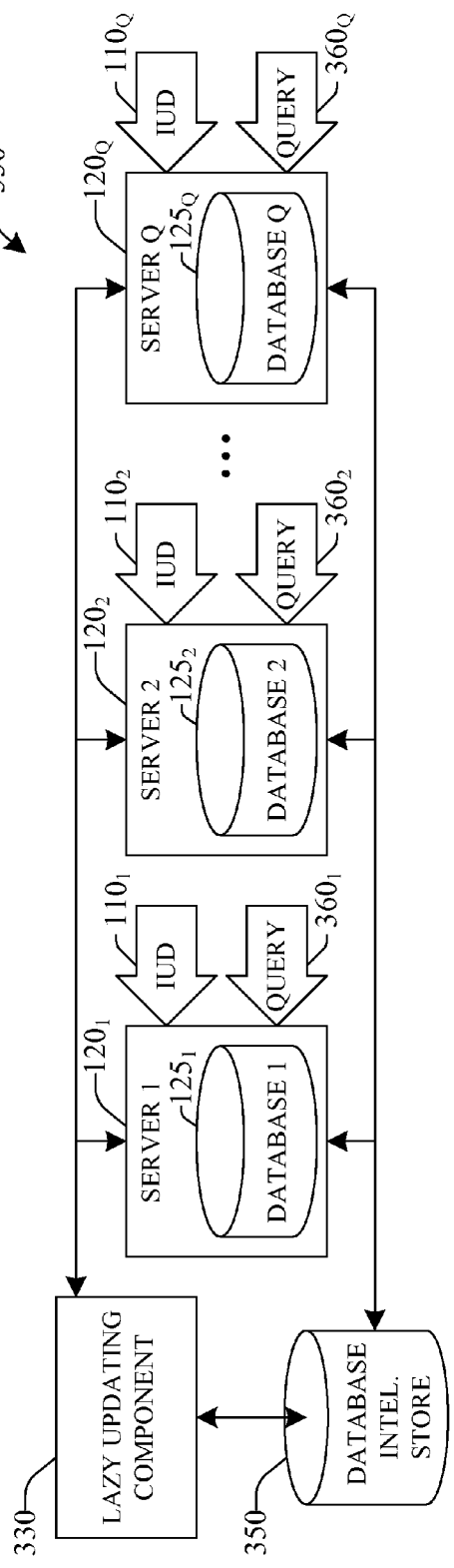

FIG. 5B illustrates an example system 550 that facilitates lazy updating of indexes in distributed data servers. Lazy updating component 330 creates, maintains, and updates disparate partitioning for tables (residing in databases $125_1$-$125_Q$) in disparate servers $120_1$-$120_Q$ in response to IUDs $110_1$-$110_Q$. Lazy updating component 330 accesses database intelligence store to determine a partitioning that optimizes insertion of new records conveyed by each IUD. For selected servers, such partitioning can include non-indexed staging partitions (e.g., $430_1$-$430_N$), as discussed in connection with FIG. 4, while for other servers staging partitioning can be indexed (e.g. $230_1$-$230_N$). Similarly, threshold sizes of staging partitions, and threshold number of partitions, associated with databases $125_1$-$125_Q$ can be customized for each database according to query workload statistics, and other forms of database intelligence, which can be retained in database intelligence component 350. It should be appreciated that a lazy updating component 330 can employ a scheduling component (not shown) to determine the order in which staging partitions are created/updated. Such a scheduling component can employ query intelligence, residing in a query log component (e.g. component 345) in database intelligence component 350, to determine an optimal schedule for manipulation of the staging partitions associated with the various tables in databases $125_1$-$125_Q$ in response to CDU requests $110_1$-$110_Q$.

Figure 6:
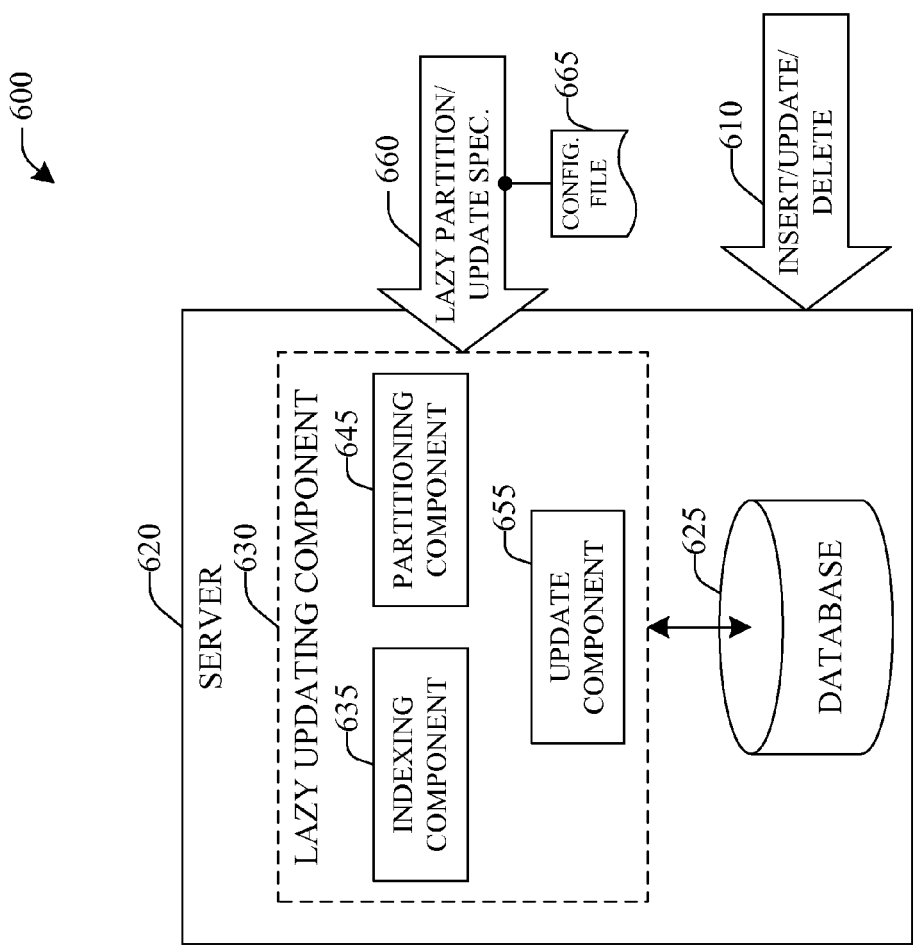
FIG. 6 is an illustration of an embodiment that facilitates lazy updating of indexes and partitioning according to custom specifications.

FIG. 6 is an illustration of an example embodiment 600 that facilitates lazy updating of indexes and partitioning according to custom specifications. An IUD request 610 is received by a server 620 that hosts database 625 and lazy updating component 635. The latter can include indexing component 635, partitioning component 645, and updating component 655, each of such components operate in substantially the same manner as their respective counterparts component 135, 145 and 155 in system 100 (FIG. 1). Lazy updating component 635 can directly receive lazy partitioning/updating specifications 660 of operational parameters, such as maximum allowable size for an active partition; maximum number of partitions that can be allowed per table in a database or index in a table before merging such partitions with a master partition (e.g., master partitions 210 or 410); and a list of indexes that can be merged eagerly and those that can be merged rarely. Moreover, specifications 660 can include destinations within file systems (e.g., file groups) wherein staging partitions are to be created. Such level of flexibility enhances the ability of a client application to tune the response of a lazy updating component 635 to IUD requests. It should be appreciated that in an aspect, lazy partitioning/updating specifications 660 can be provided in a command line of a related client application (not shown), or via a configuration file 665 downloadable in lazy updating component 635. In another aspect, specifications 660 can be conveyed through an extended set of commands/directives in a query language (e.g. SQL; extended PARTITION SCHEME commands and PARTITION functions) that are compatible with the query language model adopted by data server 620, and present a mechanism that facilitates specification of lazy partitions on tables and indexes. It is noted that other mechanisms methods to convey custom specifications are also possible; such alternative mechanisms are within the scope of the subject innovation.

Figure 7:
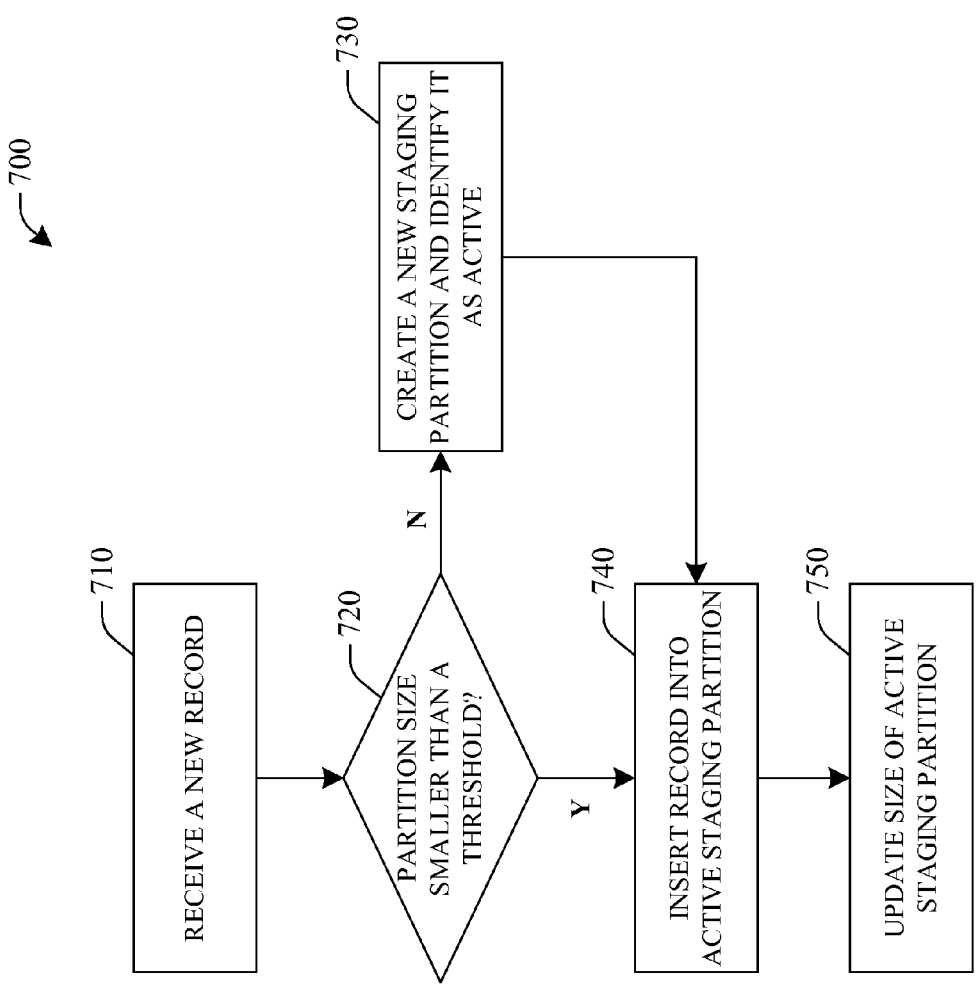
FIG. 7 presents a flowchart of a method for inserting a record in a table with a lazy partitioning scheme.
Figure 8:
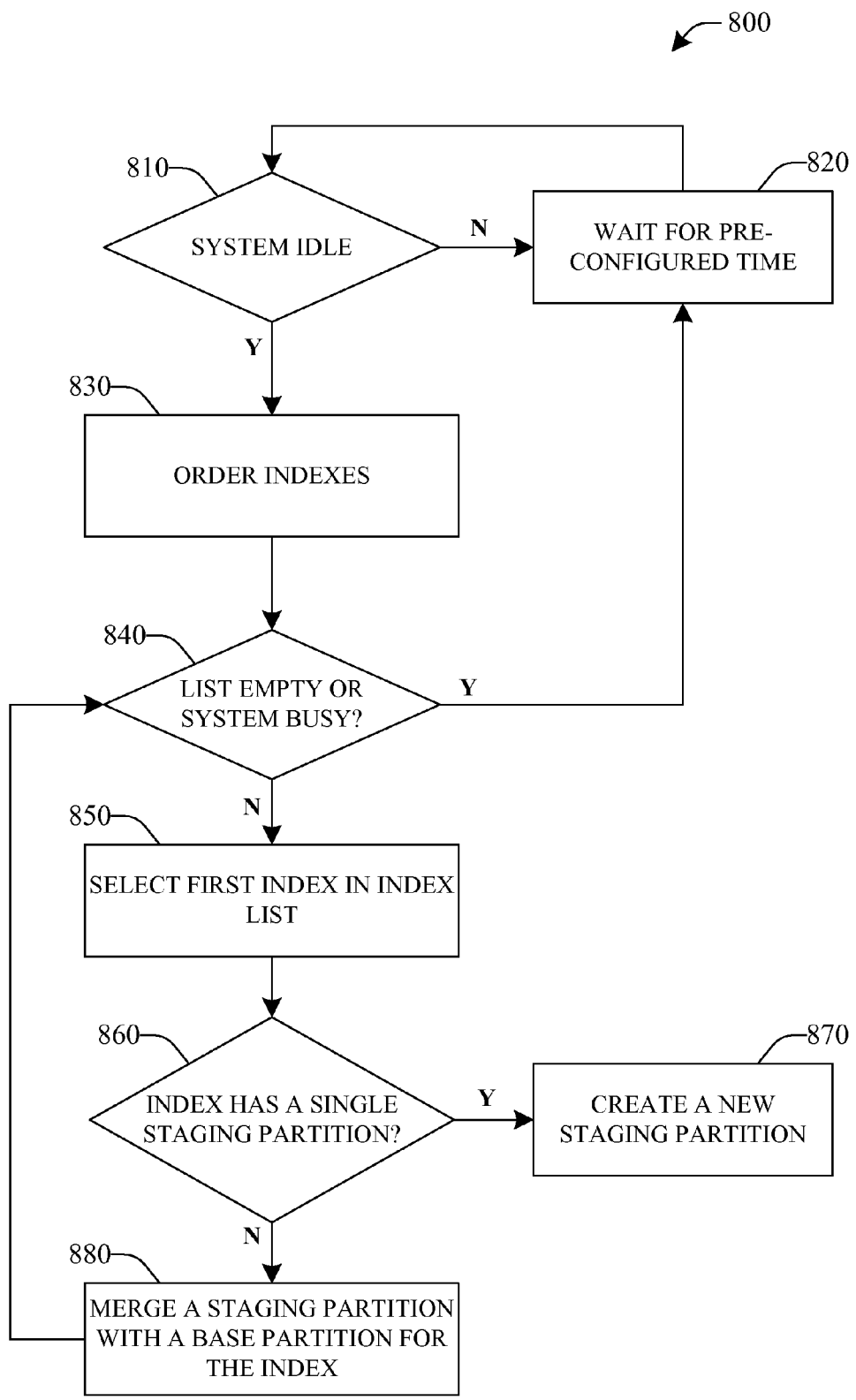
FIG. 8 presents a flowchart of method for updating a master partition in a lazy partitioning scheme.
Figure 9:
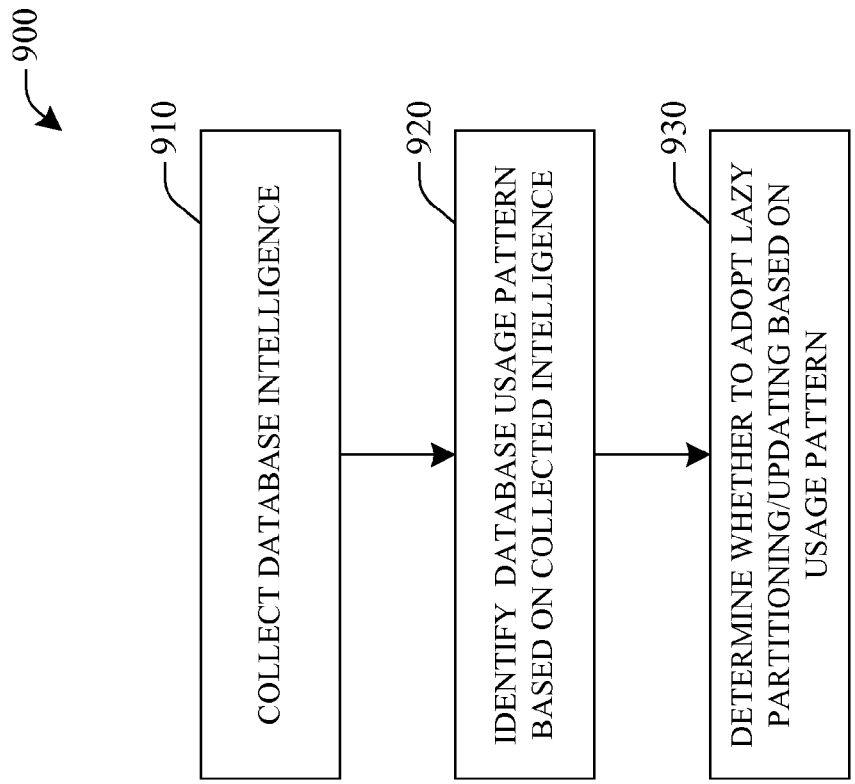
FIG. 9 is a flowchart of a method for determining whether to adopt a lazy partitioning/updating scheme in a database management.

FIGS. 7, 8 and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

FIG. 7 presents a flowchart of a method 700 for inserting a record in a table with a lazy partitioning scheme. At act 710 a new record is received. In an aspect, such a record is received in a table in response to (e.g., by resolving) an insert/update/delete request (e.g., IUD request 110). Typically, a client application that utilizes a database where the table resides can be the originator of the IUD request. Act 720 is a validation act that probes a size of an active partition size is smaller than a threshold size. Generally, checking the size of an active partition, or table, is not above a predetermined threshold ensures that such partition can remain at a size that is manageable for a database management system (DBMS), or data server, and does not deteriorate insertion performance. In an aspect, the threshold can be determined based on analysis of system performance for various partition sizes. Alternatively, a threshold size can be inferred by using heuristics based on artificial intelligence techniques that incorporate at least historical data related to system performance and usage pattern of a database. In act 730 a new staging partition is created as a result of having a partition with a size greater than the threshold. The newly created partition is identified as active. In an aspect, the new partition is created in a file system inferred from historical database intelligence that reveals the access rate to a record type as the one that is being inserted. At act 740, the record is inserted in an active staging partition, whether the partition is the original or newly created. Size of the active staging partition is updated in act 750. In an aspect, size is determined by the number of rows that a partition retains. Statistics of row number, type, origin of record (e.g., client application that issued the IUD request) are updated and retained for database intelligence accumulation.

FIG. 8 presents a flowchart of method 800 for updating a master partition in a lazy partitioning scheme. In act 810 it is checked whether a database management system, or a data server, is idle. Such is one of the possible conditions to merge records from staging partitions into a master partition (see FIG. 2) in a lazy partitioning scheme. Other conditions that can be employed to discern whether an update of the master partition is warranted are pre-configured times or time intervals, or heuristics such as the number of staging partitions associated with a table or index present at a specific time. At act 820, time is elapsed until a pre-configured time is reached, then act 810 repeats. As mentioned above, it should be appreciated that at act 820, elapsing a pre-configured time interval can be an alternative. In act 830, indexes with outstanding partitions are ordered decreasingly according to (a) number of outstanding partitions and (b) rate of access (e.g., incoming queries). At act 850, a first index in an ordered index list is selected, and in act 860 it is checked whether the selected first index has a single active partition. In the affirmative case, a new partition is created and identified as active prior to merging the single partition associated with the index and the master partition. It is noted that heuristics can be employed when creating the new staging partition to determine a file group or disk to deploy the newly created partition. In the negative condition, a partition associated with the index is merged/updated in act 880, and control is transferred to 840. Merging continues until the ordered index list is exhausted or the database management system, or the data server, is busy. In an aspect, merging entails appending the a staging partition (e.g., $420_N$; FIG. 4) to a master partition (e.g., 420; FIG. 4).

FIG. 9 is a flowchart of a method 900 for determining whether to adopt a lazy partitioning/updating scheme in a database management. Database intelligence is collected in act 910. Such intelligence originates in statistics reflecting the usage of a database; e.g., query workload; insert/update timing, search and delete timing, sizes of lazy partitions and indexes; rate of access to indexes depending on record type, originating table, and so on. In an aspect such intelligence can be collected upon executing a transaction or resolving a IUD request. At act 920, a usage pattern of the database is identified from the collected database intelligence. In an aspect, a client application can utilize two classes of records, those for active data mining and interfacing with a user, and those records for assessing and tuning performance of a database management system. While the first class of records can be actively queried (accessed), system records can be accessed at a much smaller rate (longer period of time) due to its system management nature. In another aspect, an enterprise database can maintain records of customers who engage in more than a predetermined number of business transaction, for those customers information such as postal address and ZIP code, phone number, and other contact information can be frequently accessed by telemarketers and promotions personnel associated with the enterprise, whereas records of customers that present a lesser level of engagements can be less accessed. In act 930, based on identified usage pattern, it is determined whether to adopt a lazy partitioning/updating scheme as a part of a database management. In an aspect, the usage pattern may reveal that a significant improvement in insertion performance can result in increased on-line customer satisfaction as a result of speed up in browsing inventory. Thus, it may be determined that adopting a lazy portioning/updating scheme is warranted.

Figure 10:
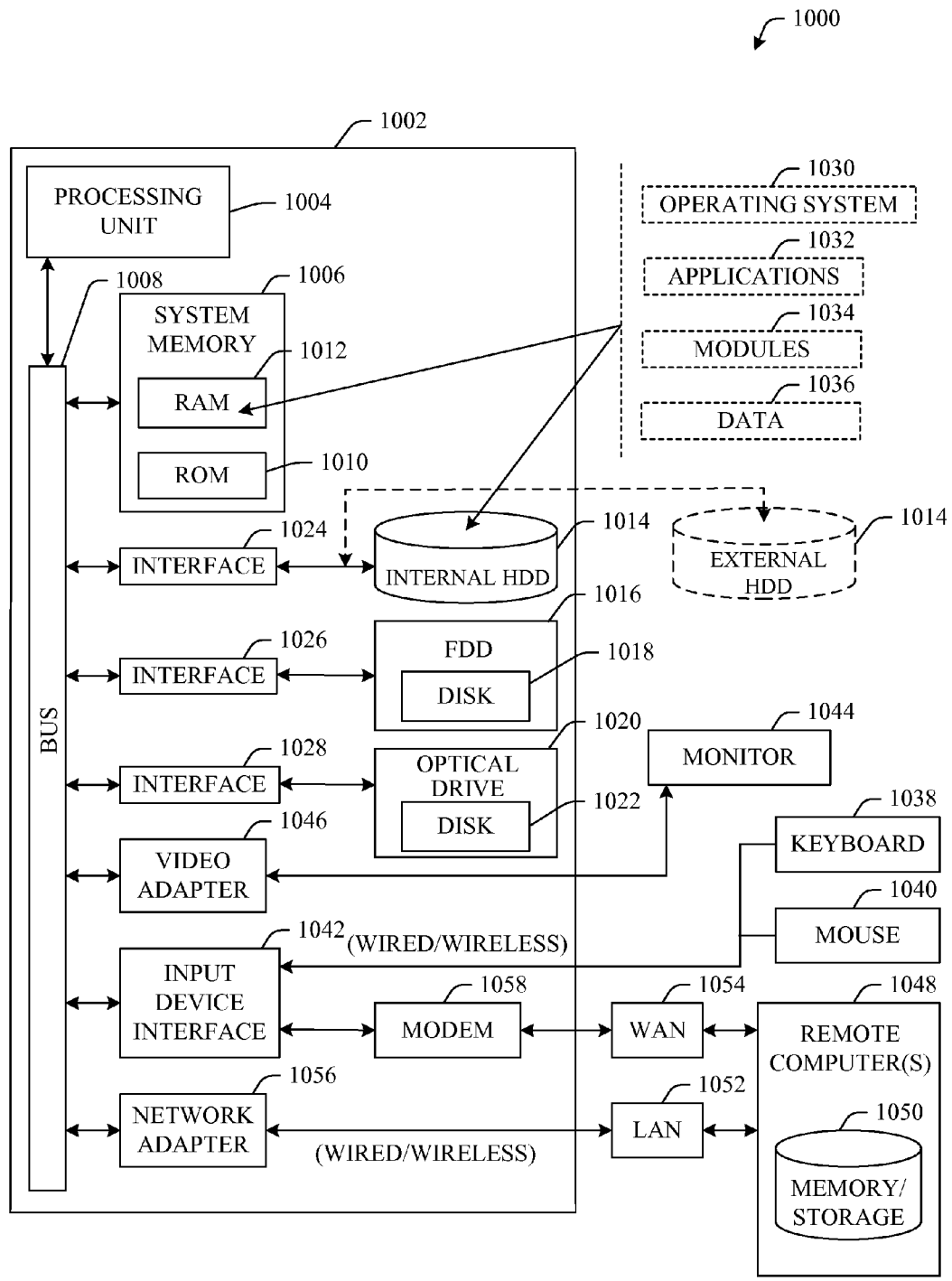
FIGS. 10 and 11 illustrate computing environments for carrying out various aspects described herein.
Figure 11:
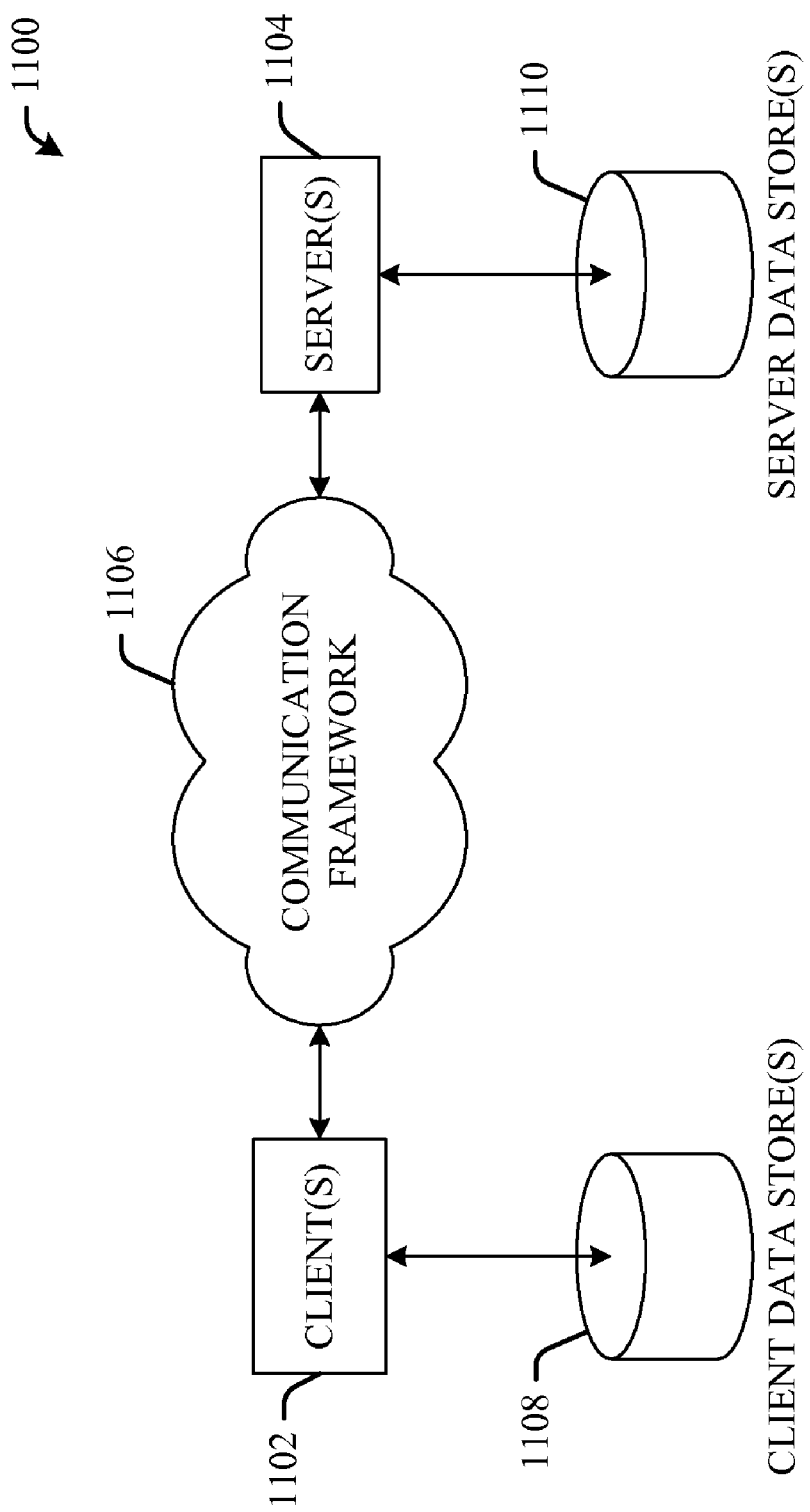

In order to provide additional context for various aspects of the subject specification, FIGS. 10 and 11 and the following discussions are intended to provide a brief, general description of a suitable computing environment 1000 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

In FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g. EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 408 via an interface, such as a video adapter 1046. In addition to the monitor 444, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g. a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 11 illustrates a schematic block diagram of a computing environment in accordance with the subject specification. The system 1100 includes one or more client(s) 1102. The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g. hard disk, floppy disk, magnetic strips . . . optical disks [e.g., compact disk (CD), digital versatile disk (DVD) . . . ], smart cards, and flash memory devices (e.g., card, stick, key drive . . . ).

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system comprising at least one processor coupled to at least one machine-readable storage medium storing instructions executable by the at least one processor to implement:
   an indexing component configured to index a plurality of records in a table in a database;
   a partitioning component configured to create a table partition in the table to insert a record in the table; and
   an update component configured to append the table partition associated with the inserted record in the table to a master partition at a delayed time with respect to an insertion time of the inserted record.

2. The computer system of claim 1, wherein the update component is further configured to append an index partition associated with the inserted record or another inserted record to a base index partition at a delayed time with respect to an insertion time of the inserted record or other inserted record.

3. The computer system of claim 1, wherein the table partition is of a predetermined size.

4. The computer system of claim 1, wherein the delayed time is at least in part determined by a time at which a system that hosts the database is idle.

5. The computer system of claim 1, wherein the delayed time is scheduled.

6. The computer system of claim 5, wherein the partitioning component is further configured to determine a threshold size of the table partition, and the update component is further configured to append the table partition to the master partition when the table partition reaches the threshold size.

7. The computer system of claim 1, wherein disparate partitions of the table have disparate indexes.

8. The computer system of claim 1, further comprising a heuristics component configured to infer a maximum allowable size for a partition.

9. The computer system of claim 8, wherein the heuristics component is further configured to infer a location in a file system to create an index partition based at least in part on a rate of access for the index.

10. The computer system of claim 1, wherein the partitioning component is configured to generate a plurality of partitions across a plurality of databases.

11. The computer system of claim 1, wherein the update component is further configured to append the table partition to the master partition at one of a plurality of pre-configured time intervals.

12. A computer-implemented method, comprising:
receiving a new record, the record associated with a table in a database;
creating a table partition of the table in response to receiving the new record, and inserting the record in the partition; and
merging the table partition with a master partition associated with the table at a delayed time with respect to inserting the record in the table partition.

13. The method of claim 12, comprising merging the table partition with the master partition at a delayed time corresponding to a member of a set of pre-configured times.

14. The method of claim 12, comprising merging the table partition with the master partition at a delayed time corresponding to a time at which a server that hosts the database is idle.

15. The method of claim 12, further comprising inferring a maximum allowable size for a partition of an index associated with a record in the table, the size based on query statistics regarding access of the index.

16. The method of claim 12, further comprising inferring a destination in a file system wherein one or more partitions are to be created based on query workload statistics for the database.

17. The method of claim 12, further comprising inferring whether to perform the merging based on a database usage.

18. The method of claim 12, further comprising receiving partitioning specifications relating to a maximum allowable size for the table partition.

19. The method of claim 12, further comprising deploying the table partition to a disparate file system from a file system on which the table partition was originally created, based on the table partition reaching a threshold size.

20. A computer-readable storage medium storing instructions, the instructions to, if executed by a computing device, cause the computing device to perform operations comprising:
receiving a new record associated with a table in a database;
inserting the new record in a table partition in the table, if the table partition is smaller than a threshold size; and
merging the table partition with a master partition if the table partition reaches the threshold size.

* * * * *